United States Patent [19]

Berte et al.

[11] Patent Number: 4,851,186
[45] Date of Patent: Jul. 25, 1989

[54] NUCLEAR REACTOR CORE AND PROCESS FOR CHARGING SAID CORE

[75] Inventors: Michel Berte, Caluire; Eric Francillon, Villeurbanne; Gerard Chiarelli, Jonage, all of France

[73] Assignee: Novatome, Courbevoie, France

[21] Appl. No.: 146,543

[22] Filed: Jan. 21, 1988

[30] Foreign Application Priority Data

Jan. 21, 1987 [FR] France ................ 87 00683

[51] Int. Cl.$^4$ ................ G21C 3/30; G21C 3/14
[52] U.S. Cl. .................... 376/364; 376/352; 376/447
[58] Field of Search ............. 376/364, 365, 175, 176, 376/362, 452, 440, 264, 352, 447, 435

[56] References Cited

U.S. PATENT DOCUMENTS

| | | | |
|---|---|---|---|
| 3,383,287 | 5/1968 | Jackson | 376/362 |
| 3,619,367 | 11/1971 | Gumuchian | 376/434 |
| 3,802,996 | 4/1974 | Jones | 376/440 |
| 3,912,582 | 10/1975 | Marinos et al. | 376/365 |
| 4,017,357 | 4/1977 | Patterson, Jr. | 376/364 |
| 4,198,272 | 4/1980 | Salmon | 376/175 |
| 4,202,726 | 5/1980 | Duncombe et al. | 376/175 |
| 4,352,778 | 10/1982 | Arnaud et al. | 376/365 |
| 4,420,458 | 12/1983 | Dunlap et al. | 376/440 |
| 4,505,877 | 3/1985 | Rion | 376/352 |
| 4,746,488 | 5/1988 | Pradal et al. | 376/365 |

FOREIGN PATENT DOCUMENTS

| | | |
|---|---|---|
| 1570497 | 5/1969 | France . |
| 2152581 | 4/1973 | France . |
| 2316703 | 1/1977 | France . |

*Primary Examiner*—Deborah L. Kyle
*Assistant Examiner*—Daniel Wasil
*Attorney, Agent, or Firm*—Pollock, Vande Sande & Priddy

[57] ABSTRACT

The core is constituted by detachable assemblies (21) disposed vertically and maintained in position by a support or bolster (22) receiving the lower part or foot (21a) of the assemblies (21) inside sleeves having a vertical axis (25). Each of the sleeves (25) includes at least one orientation configuration (31) for the assembly (21) and each of the assemblies (21) includes on its foot (21a) at least one orientation configuration (30) adapted to cooperate with the orientation configuration (31) of the sleeve (25). The charging of the first core of the reactor may be carried out in a simple operation without a prior charging of false assemblies in an air atmosphere.

5 Claims, 2 Drawing Sheets

NUCLEAR REACTOR CORE AND PROCESS FOR CHARGING SAID CORE

FIELD OF THE INVENTION

The invention relates to a core of a nuclear reactor and a process for charging said core.

BACKGROUND OF THE INVENTION

A core of a nuclear reactor, such as a fast neutron nuclear reactor cooled by liquid metal, comprises detachable assemblies disposed vertically and maintained in position by a support or bolster in which the lower parts or feet of the assemblies of the core are engaged, inside sleeves having a vertical axis disposed in a network corresponding to the network of the assemblies in the core. The vertical sleeves, termed pillars, join the upper part to the lower part of the bolster which is in the form of a hollow structure into which the coolant fluid of the reactor is injected, this fluid usually being constituted by liquid sodium. Each of the pillars comprises openings for the passage of the liquid sodium, corresponding openings in the foot of the assembly being aligned with the openings of the pillar. The liquid sodium can consequently travel to the assemblies in the upward direction for cooling said assemblies.

The fuel assemblies comprise, above their foot of generally cylindrical shape which is engaged in the sleeve, a prismatic part usually having a hexagonal section and terminating in its upper part in a head permitting the seizure of the assembly for its handling and possibly ensuring the upper neutronic protection of the assembly.

The assemblies constituting the core of a fast nuetron reactor are of several different types and have a predetermined position in the core. Some of these assemblies are fuel assemblies in which the power of the core is created, others of the assemblies being fertile and capable of ensuring a certain regeneration of the nuclear fuel, and still other assemblies being absorbent of various types for regulating the power or effecting urgent stoppages of the reactor.

When effecting the first charging of the core of the reactor, it is necessary not only to place each of the assemblies in a defined position in the core, but also to correctly and precisely orient the assemblies relative to one another owing to their prismatic shape, the hexagonal sections of these assemblies being imbricated so as to constitute the cross-section of the core. It is also necessary to simultaneously place the opengings provided in the foot of the assembly into alignment with the openings provided in the pillars of the bolster to obtain satisfactory conditions for the circulation of the coolant fluid as it enters the core.

In prior art designs of cores of fast neutron nuclear reactors, the feet of the assemblies are free to rotate about the axis of the pillar, all the corresponding foot and pillar sections bearing against one another being circular. When they are placed in position in the core, the assemblies are suspended from the grab of a handling machine so as to be substantially free to rotate about their vertical axis. The sole limit to the rotation of the assembly is provided by the friction of the bearing members for the suspension of the assembly from the grab under the effect of the weight of the assembly.

In order to ensure correct orientation of the assemblies relative to one another, there are provided around the assembly, in the part of the foot connected with the hexagonal body, contact surfaces having the shape of cams or shoes adapted to cooperate with contact surfaces of corresponding shape on the neighboring assemblies.

The constitution of the network of assemblies corresponding to the first core introduced in a new reactor is by a series of operations for achieving a perfect relative orientation of the assemblies of the network relative to one another.

Before the filling of the vessel with liquid sodium, a complete network is constituted with false assemblies having the same geometry as the true assemblies. Each false assembly is placed in position manually, and then an in situ visual inspection permits checking that the sodium passage openings in the foot of the assembly are perfectly aligned in with the corresponding openings of the pillar. This positioning and this checking can easily be carried out, since the vessel of the reactor in which the core is constituted is at that time in a normal atmosphere of air.

When all the false assemblies have been placed in position, there is available a complete network which acts as a reference for all the other handling operations which may be effected on the assemblies, and in particular for the charging of the first core after the vessel has been filled with liquid sodium. The false assemblies are replaced by the true assemblies by successive substitutions, each assembly taking the place of a false assembly having exactly the same geometry, and in particular identical contact and orientation surfaces.

When an assembly is introduced in a cavity consituted by six adjacent assemblies, it is possible to correct a slight angular offset of this assembly by cooperation of the corresponding orientation surfaces. However, the risk of a progressive angular offset of the assemblies relative to one another is not completely eliminated. Such a progressive offset may result in difficulty in the introduction of an assembly or in a large disalignment between the openings of the pillars and the openings of the foot of the assembly. In this case, the passage of the coolant liquid sodium in the assembly may be considerably affected.

In the course of the charging by progressive substitution of the assemblies of the first charge for the false assemblies, the position of each of the assemblies in the core is located in a precise manner by conventional primary handling means of the reactor.

The charging operations of a fast neutron nuclear reactor are therefore long and difficult to carry out, and the adaptation of the assemblies requires the formation of orientation shoes whose profiles are very complex.

Furthermore, the self-orienting shoes do not always perform their function, in particular when the assemblies are deformed after a certain irradiation time in the reactor.

Difficulties are also related to the design of the seizing head of the assembly and its connection with the hexagonal case constituting the body of the assembly.

Even in the case where they do not ensure the upper neutronic protection of the assembly, these seizing heads are massive and the design is delicate, bearing in mind the considerable thermal disturbances prevailing in the upper part of the assemblies.

SUMMARY OF THE INVENTION

An object of the invention is therefore to provide a core of a nuclear reactor constituted by detachable assemblies disposed vertically and a support or bolster receiving the lower part or foot of the assemblies, inside sleeves having vertical axes or pillars provided with openings for the passage of coolant fluid of the reactor located in alignment with openings provided in the foot of the assembly, said core comprising assemblies of simplified shape which are capable of being placed in position, with a perfect orientation around their vertical axes relative to the bolster and relative to the adjacent assemblies, by simple operations.

For this purpose, each of the pillars comprises at least one means for orienting the assembly about the axis of the pillar, and each of the assemblies includes on its foot at least one orientation means adapted to cooperate with the corresponding means of the pillar, the engagement of the corresponding orientation means one on the other being effected at the moment of the introduction of the foot of the assembly in the bolster.

The invention also relates to a simplified process for charging a nuclear reactor core.

BRIEF DESCRIPTION OF THE DRAWINGS

An embodiment of the invention will now be described with reference to the accompanying drawings, in which.

DESCRIPTION OF PREFERRED EMBODIMENT

Figure 1:
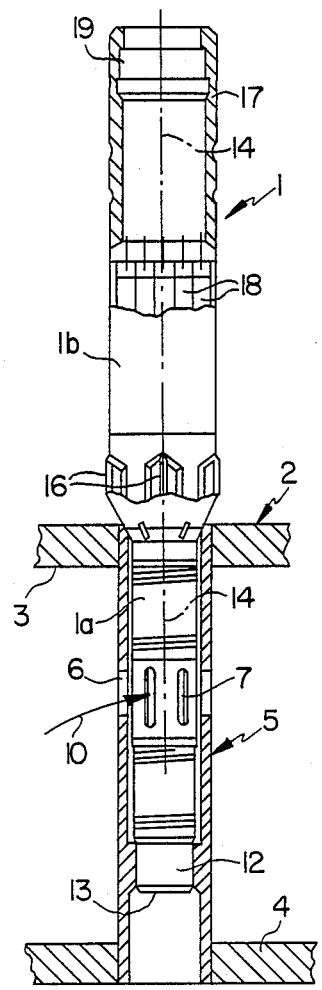
FIG. 1 is an elevational view, partly in section of a fuel assembly of a core according to the prior art, in position in the corresponding pillar of the bolster.

FIG. 1 shows a fuel assembly 1 in operating position in the support 2 of a nuclear reactor core according to the prior art. The support 2 or bolster comprises a horizontal upper plate 3, a horizontal lower plate 4 and an assembly of tubular sleeves 5 having a vertical axis, termed pillars. The pillars 5 interconnect the upper part and the lower part of the bolster which defines a free space between its upper plate 3 and lower plate 4. Liquid sodium for cooling the core is injected by primary pumps of the nuclear reactor into this space in the bolster 2. Each of the pillars 5 has an inner bore having a shape enabling it to receive the lower part 1a or foot of an assembly 1. The pillars include openings 6 extending through their lateral wall in confronting relation to corresponding openings 7 provided in the foot of the assemblies. Liquid sodium coolant can in this way enter the foot of the assembly and circulate in the vertical upward direction within this assembly for cooling the latter (arrows 10). The lower part 12 of the foot of the assembly, of cylindrical shape with a circular section, is engaged in a corresponding part 13 of the inner bore of the pillar 5. The assembly 1 is therefore mounted in the bolster 2 to be rotatable about the vertical axis of the pillar 14 which is coincident with the vertical axis of the assembly.

Figure 2:
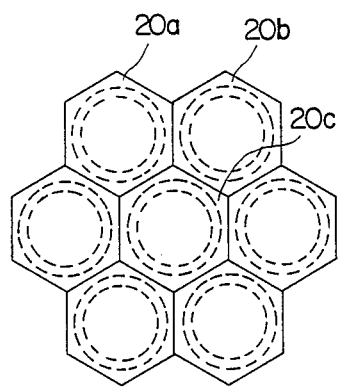
FIG. 2 is a partial plan view of the core of a fast neutron nuclear reactor.

The part of the assembly 1 disposed above the foot 1a, and constituting the body 1b of this assembly, has a hexagonal cross-sectional shape, as shown in FIG. 2. In this figure, it can be seen that the adjacent assemblies 20a, 20b, 20c . . . , constituting the network of the core, are in contact by their lateral surfaces, each assembly surrounded by six identical assemblies occupying a prismatic cell having a hexagonal section defined by the adjacent assemblies. When the assemblies 1 are placed in position to constitute the first charge of the core, the assemblies are self-orientable, each about its vertical axis 14, owing to the provision of guide and orientation surfaces 16 machined in the lower part of the body 1b of each of the assemblies. The guide and orientation surfaces 16 of the adjacent assemblies cooperate to provide a suitable relative orientation of the assemblies relative to one another. At the moment of the constitution of the first core with false assemblies, the shape to be given to the guide and orientation surfaces 16 of each of the assemblies is determined in a precise manner. In particular, the orientatin of the assemblies must ensure a perfect alignment between the openings 7 of the foot 1a of each of the assemblies with the opening 6 of the corresponding pillar 5.

The body 1b of the assembly 1 is connected in its upper part with a relatively massive head 17 which has a double function. The head 17 first of all ensures the suspension of a group of bars 18 of a material which absorbs the neutrons and provides the neutronic protection of the upper structures of the reactor. The head 17 also includes an inner part 19 terminating in a shoulder which enables the assembly to be seized by the grab of the machine handling the assemblies of the reactor. The head 17 is fixed by a forming over or setting operation or by welding to the body 1b of the assembly.

When the nuclear reactor is operating, the head part 17 of the assemblies is subjected to considerable stresses of thermal origin owing to the conditions prevailing in this region of the core. The massive head 17 and its connection to the body 1b of the assembly are therefore difficult construct.

Figure 3:
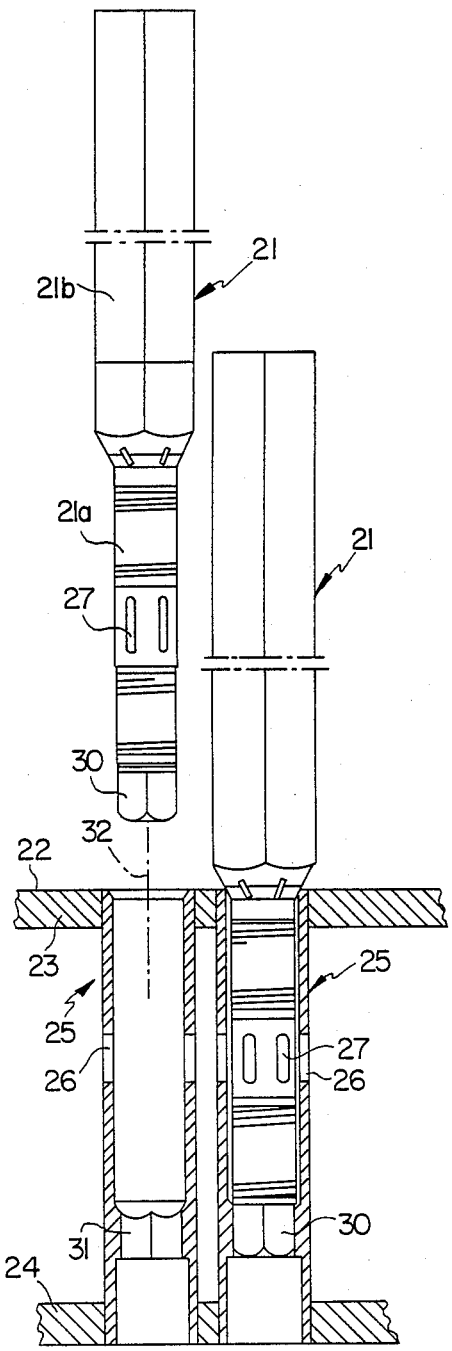
FIG. 3 is an elevational view partly in section of a part of the core of a fast neutron reactor according to the invention, comprising a fuel assembly in raised position and a fuel assembly in a position inserted in the bolster.

In FIG. 3, a part of a nucleaar reactor core according to the invention has been shown with a cross-sectional shape in the region of the body of the assemblies corresponding to that represented in FIG. 2.

Figure 4:
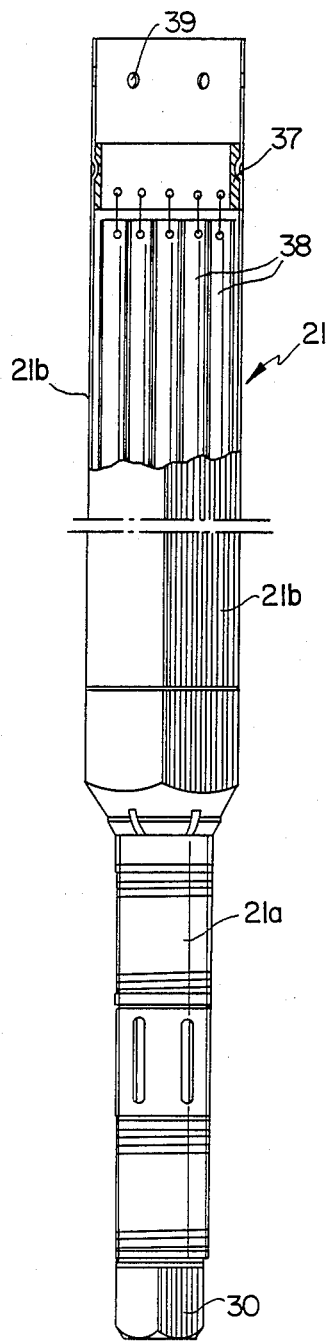
FIG. 4 is an elevational view, partly in section, of a fuel assembly of a core according to the invention.

An assembly 21 of a core according to the invention is shown in its position extracted from the core and in its operating position in the core in FIG. 3. In FIG. 4, the assembly 21 is shown to an enlarged scale and partly in section.

The core according to the invention has a general structure similar to the core of the prior art reactor shown in FIG. 1. It comprises a bolster 22 constituted by an upper plate 23 and a lower plate 24 interconnected by tubular struts or pillars 25. The tubular struts 25 receive the feet 21a of the assemblies which are provided with openings 27 which come into alignment with openings 26 provided in the corresponding pillars 25 for the passage of the liquid sodium in the assembly 21. The lower part 30 of the foot 21a of the assembly 21 has a prismatic shape with a hexagonal section whose axis is coincident with the axis 32 of the pillar 25, and the assembly 21 and the bore of the pillar 25 includes a corresponding part 31 of prismatic shape also having the axis 32 for its axis. The orientation of the assembly 21 relative to the bolster 22 is thus ensured by the corresponding male and female prismatic surfaces 30 and 31, at the moment at which the foot 21a of the assembly is inserted in the bolster 22. This orientation, which corresponds to a perfect alignment of the openings 27 and openings 26, is maintained, when the assembly is in the service position in the core, as shown in the right-hand part of FIG. 3, the assembly 21 being prevented from rotating about its axis inside the bore of the pillar 25.

The design of the bolster 22 and, in particular the position and the orientation of the pillars 25 relative to one another, is such that the bodies 21b of the assemblies whose feet 21a are prevented from rotating in the pillars 25 of the bolster 22, are disposed in a hexagonal network whose section is shown in FIG. 2.

It is now no longer necessary to provide guide and orientation surfaces similar to the surfaces 16 of the prior art assembly 1 in the lower part of the body 21b of the assembly of a core according to the invention.

FIG. 4 shows the upper part of the body 21b of the assembly which comprises a simple tubular member 37 having a hexagonal section for supporting the bars 38 of the upper neutronic protection of the assembly instead of a massive member such as the member 17 of an assembly according to the prior art shown in FIG. 1. The member 37 is set or welded inside the case of the body 21b of the assembly. This case of the body 21b is extended above the member 37 and includes in this upper region through openings 39 permitting the engagement of claws of the grab handling the assembly.

Figure 5:
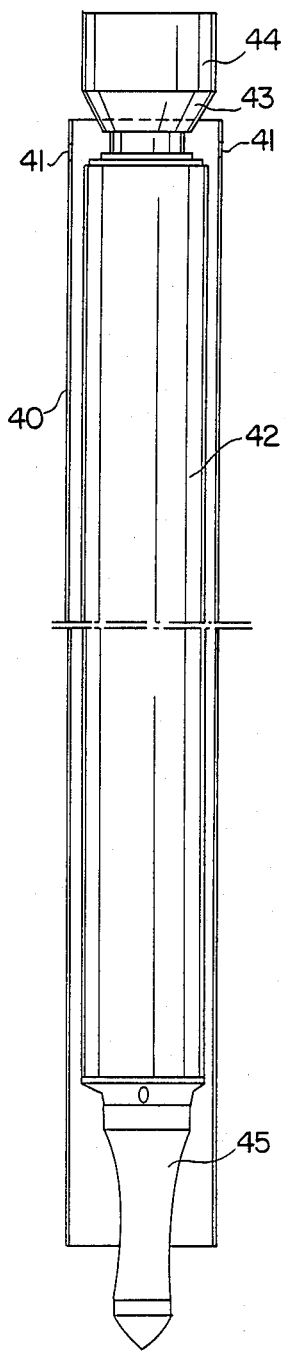
FIG. 5 is an elevational view partly in section, of a control assembly of a fast neutron nuclear reactor core according to the invention.

FIG. 5 shows the case 40 of the body of a control assembly of the nuclear reactor. This case 40 of hexagonal shape is identical to the case of the body 21b of a fuel assembly such as that shown in FIGS. 3 and 4. The foot part of the control assembly (not shown) is identical to the foot part 21a of a fuel assembly such as that shown in FIGS. 3 and 4. The case 40 of the control assembly includes through openings 41 in its upper part for the introduction of the claws of a handling grab when placing the fixed guide part 40 of the assembly in the core. The fixed part 40 is adapted to receive an absorber unit 42 which is vertically movable in the core by means of a mechanism comprising a control rod of great length which may be connected to the head 43 of the absorber unit 42 by means of an electromagnet 44.

The assembly shown in FIG. 5 is a control assembly enabling the reactor to be stopped urgently in the event of an incident.

Several assemblies identical to the control assembly shown in FIG. 5 are placed in predetermined positions in the core. When the reactor is operating normally, the absorber units 42 of these assemblies are in the upper position represented in FIG. 5 and maintained in this position by the electromagnets 44. In the event of an incident, the supply current of the electromagnets 44 is cut off and the units 42 drop to the lower position of maximum insertion in the core of the reactor. The lower part 45 of the absorber assembly 42 constitutes with the foot part of the case 40 of the assembly (not shown) a dash-pot which absorbs the kinetic energy acquired by the absorber assembly 42 during its fall.

When the absorber assemblies 42 are in their position of maximum insertion in the core, the neutronic power of the core is reduced to a very low value.

The control assemblies of the prior art comprise, as the fuel assemblies, a massive head member for handling the assembly and placing it in position or retracting it from the core. This massive member connected to the upper part of the case of the assembly results in a reduction in the section of the passage in the upper part of the assembly. The section of the block of the head 43 of the absorber assembly 42 and the height of the maximum rise of this assembly 42 are then reduced relative to those possible with an assembly according to the invention such as that shown in FIG. 5.

The control assemblies may be of the type shown in FIG. 5 and serve to stop the reactor urgently, or may be in the form of an absorber unit permanently connected during the operation of the reactor to the control rod whose displacement results in a greater or lesser great insertion of the absorber unit in the core to control the neutronic flux and the power of the reactor.

In this case, as in the case of the urgent stoppage control assemblies, the upper part of the case of the fixed part of the assembly has through openings for the handling of the assembly and is not connected to the massive seizing member.

The section of the passage of the absorber unit is therefore not reduced, and coresponds to the total section of the opening of the case 40 in its upper part. In this case, it is possible, as in the case of the urgent stoppage control bars, to raise the absorber unit to a height exceeding the interior of the fixed structure of the control assembly. In both cases, it is possible to raise the absorber unit to a height exceeding that of the assembly heads in the core. In this way, greater freedom is provided in the design of the core of the nuclear reactor. All of the control assemblies, as all of the fuel assemblies, have a foot part which is part of their fixed case, engaged in the bolster of the reactor by a prismatic surface cooperating with a corresponding prismatic surface of the bolster. This produces an orientation and a maintenance of the assemblies for achieving, when charging the core, perfect alignment between the openings of the assembly feet with the openings of the pillars of the bolster.

The fuel assemblies such as that shown in FIGS. 3 and 4 may be of the fissile type or of the fertile type, depending on the composition of the fuel rods they enclose.

It will be clear that the core of the nuclear reactor according to the invention may be constituted, when effecting the first charging of the reactor, by a simple operation of placing the fuel assemblies, each one in a position inside the core, in a position perfectly determined by the position of the corresponding pillar. Each of the assemblies is taken hold of by the grab whose claws are engaged in the openings extending through the upper part of the body of the assembly. The position of these openings in the body of the assembly enables it to be placed in a perfectly determined position below the handling device, as concerns its orientation about its verticaal axis. This orientation permits an introduction of the foot of the assembly in the pillar so that the corresponding prismatic surfaces of the assembly and the pillar are in concordance. When an assembly rests in the corresponding pillar of the bolster of the reactor, its orientation about its vertical axis is perfectly determined and permanently fixed so that the adjacent assemblies, whose orientation is likewise defined and fixed at the moment of their insertion in the corresponding pillars, come to place themselves automatically in a contiguous manner against the peripheral surfaces of the assembly. The corresponding orientation parts of the assembly and of the pillar also permit perfect alignment between the openings of the foot of the assembly and the openings of the pillar.

All of the assemblies of the core, whether they be fuel, fissile or fertile, control assemblies or other types of assemblies, include means for orienting them relative to the bolster, and consequently to one another.

It is therefore no longer necessary to provide special and complex machinings on the surface of the body of the assemblies or attached centering and orientation members, and the design and the construction of the assemblies are thus considerably simplified.

The process of charging the first core of the reactor is itself considerably simplified, since it is no longer necessary to construct a core under air atmosphere with false assemblies prior to the effective charging of the core. The charging may be effected directly in the liquid sodium with true assemblies. Furthermore, the angular immobilization of the assemblies avoids any deformation or evolution of the core over a period of time under the effect of the stress undergone in service.

The elimination of the self-orienting shoes of the assemblies relative to one another enables the connection between the foot and the prismatic case having a hexagonal section of the body of the assembly to be more simply designed. This connection may be achieved by a press operation instead of a welding operation, or a saving may be achieved as concerns the axial overall size of the assembly which may be taken advantage of for increasing the height of the fuel in each of the assemblies and therefore in the whole of the core.

In the same way, the saving in the axial overall size of the body of the assembly due to the elimination of the seizing head enables the height to the fuel in each of the assemblies, and therefore in the whole of the core, to be increased. The elimination of the massive seizing head also permits a simplification of the design of the assembly as concern the calculation of its dimensions, its construction and the control of the connection between the hexagonal case of the body and the massive head.

Generally, the simplications rendered possible permit a reduction in the quantities and therefore in the cost of the raw materials employed and a limitation in the production of waste products which are stored and retreated when discharging the core.

The orientation means on the foot of the assembly and in the pillar of the corresponding bolster may have a shape different other than a prismatic shape having a hexagonal section. It is possible to use prismatic shapes of any section, male parts and corresponding female parts of any shape which are not symmetrical of revolution about the axis of the assembly and pillar, studs and openings of corresponding shapes or projecting parts and recesses capable of cooperating for ensuring the orientation and the immobilization of the foot of the assembly relative to the bolster.

For the hooking and the orientation of the assembly by the handling grab, it is possible to use, instead of the through openings any other form obtained by a press or machining operation, bosses or hollows directly obtained on the hexagonal case.

The materials and the surface treatments of the male and female parts of the orientation contact means are selected to avoid any attachment of material and any excessive wear both when the reactor is operating and when reactor discharging and charging operations are being carried out.

The invention is applicable not only to fast neutron nuclear reactors but also to any nuclear reactor comprising a core formed by vertical fuel assemblies engaged by their foot in a support into which a reactor cooling fluid is sent.

We claim:

1. A core of a nuclear reactor comprising detachable vertical assemblies having a lower part, a bolster including hollow pillars each having a vertical axis and receiving said lower part of said assemblies, first openings in said pillars for the passage of a coolant fluid for the reactor, second openings in said lower parts of said assemblies in alignment with said first openings in said pillars, each pillar including at least one means for orienting the respective assembly about said axis of said pillar and each assembly comprising
    (a) a vertical body having an upper part in the form of an open tubular case having a lateral wall and openings extending through said lateral wall of said tubular case and so located that the body of the assembly is placed in a predetermined position as concerns its orientation about its vertical axis below a handling device having claws engaged in said openings; and
    (b) a lower part having at least one orientation means adapted to cooperate with the corresponding orientation means of said pillar, when introducing said lower part of the assembly in the said pillar in a predetermined orientation by means of said handling device.

2. A core of a nuclear reactor according to claim 1, wherein the orientation means of said pillar comprises a prismatic cavity provided inside said pillar and the corresponding orientation means of said lower part of said assembly comprises a male prismatic surface of corresponding shape provided on said lower part of said assembly and being coaxial with said assembly.

3. A core of a nuclear reactor according to claim 2, wherein said prismatic surfaces have a hexagonal cross-sectional shape.

4. A core of a nuclear reactor according to claim 3, wherein the assemblies of the core comprise an annular member having an inner part connected to said tubular case of said body of said assembly located below said seizing means, and bars of a material absorbing neutrons constituting an upper neutronic protection carried by said annular member of the assembly.

5. A core of a nuclear reactor according to claim 1, wherein said assemblies of the core comprise a body of prismatic shape whose cross section is hexagonal.

* * * * *